July 16, 1935.   H. E. BUMGARDNER   2,008,199
DEVICE FOR MEASURING THE DENSITY OF SMOKE
Filed Jan. 19, 1931
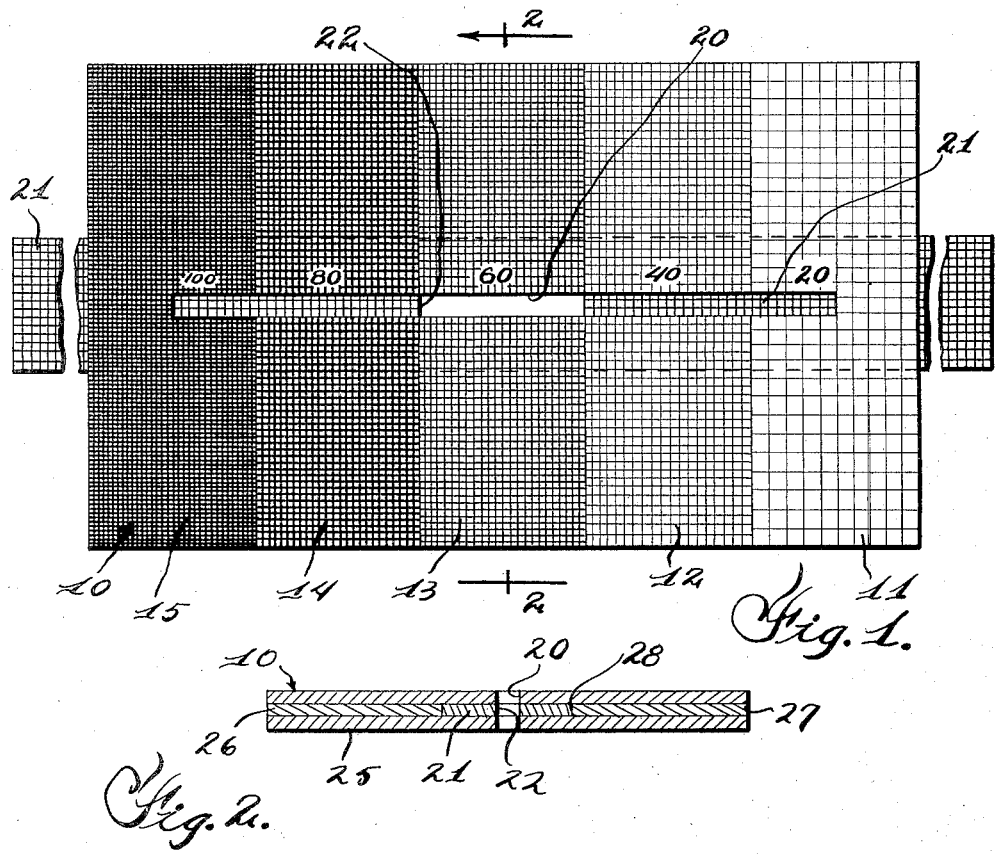

UNITED STATES PATENT OFFICE 2,008,199

DEVICE FOR MEASURING THE DENSITY OF SMOKE

Harvey E. Bumgardner, Detroit, Mich.

Application January 19, 1931, Serial No. 509,842

10 Claims. (Cl. 88—14)

This invention relates to measuring devices and has particular reference to a device for measuring the density of smoke or the like.

The invention numbers among its objects the provision of a device of the above mentioned character by which the smoke being observed may be brought into direct juxtaposition to a graded color band, a device which will function to focus the vision of the observer on the smoke being observed, and a device which will provide a record of the degree of density of the smoke observed.

Other objects and advantages of the invention will become more apparent as the following description proceeds, particularly when reference is had to the accompanying drawing, wherein:

Figure 1 is a plan view of a device constructed in accordance with the teachings of this invention;

Figure 2 is a sectional view taken substantially on the line 2—2 of Figure 1; and Figure 3 is a plan view of the slide forming a part of the device shown in Figure 1.

Heretofore one of the most frequently used devices for measuring the density of smoke has been a chart having a white background and having printed thereon a plurality of rectangles corresponding to different densities of smoke. These printed rectangles are covered with black lines which obscure a percentage of the white surface corresponding to the density it is desired to indicate. Thus these rectangles are not only surrounded by a white background but are also formed by a plurality of lines which obscure a percentage of a white background.

A further form of device which has gone into considerable use is a disk having a plurality of radial black lines on a white background. When this disk is revolved, a grayness results which varies in density from the periphery to the center of the disk. In use, this disk is revolved and a comparison is made between the smoke observed and the various shades of gray on the revolving disk.

In both of these devices it is necessary that the chart be held at a distance from the observer in order that the proper degree of grayness will be obtained. The white background of the charts is misleading to the eye when observing smoke emitting from a stack having the usual blue or gray background, and considerable difficulty is therefore experienced in obtaining a correct comparison. The present invention contemplates the elimination of these defects by the provision of a chart which has no white background but which rather has a series of areas of different shades, together with means by which the smoke being observed may be brought into juxtaposition with any one of these areas.

Referring then particularly to the drawing wherein like reference characters designate corresponding parts throughout all views, the numeral 10 designates a sheet of relatively stiff material such as cardboard or the like. The face of this sheet is divided into a series of areas or bands which are of graded colors to correspond to different densities of smoke. The several areas are designated by the reference characters 11 to 15, inclusive, and it will be noted that the area 11 is lightly shaded to correspond to a smoke density of twenty percent, while the area 15 is substantially black to correspond to a smoke density of one hundred percent. The intermediate areas or bands are of intermediate shades or colors, corresponding to smoke densities of forty, sixty, and eighty percent, respectively. It is to be understood that these areas are of solid colors of different shades and are not formed by lines variably spaced apart on a white background.

Extending longitudinally of the chart is a slot 20 which, it will be noted, extends across all of the bands. It is contemplated that the smoke will be observed through this slot with the result that the smoke and the graded color bands may be brought in direct juxtaposition to each other.

For the purpose of cutting off the light which would otherwise be transmitted through the length of the slot and to provide for focusing the vision of the observer on the smoke being observed, there is provided a slide 21 which may be in the form shown in Figure 3 of the drawing. This slide is provided with a sight opening 22 adapted to register with the slot 20, this sight opening being preferably the width of one of the graded bands.

To provide a guideway for the slide there is fixed to the rear face of the chart a backing 25 which is held in spaced relation to the rear face of the chart by spacers 26 and 27. These spacers are arranged in spaced relation to each other to provide the guideway 28 in which the slide 21 may be readily reciprocated.

In use, the chart is held in position with one hand for observing the smoke, and by moving the light shield or slide longitudinally of the slot with the other hand, the smoke may be observed through the slot in the chart. Thus the smoke being observed may be brought into direct juxtaposition with any one of the shaded areas and when the observed smoke corresponds in color to the shaded area with which the sight opening is in registry, a reading may be taken directly from the chart which will give the density of the smoke being observed. It will be noted that the densities of the various areas are marked adjacent the slot so that after the observation is made a permanent and accurate reading may be readily obtained.

From the above it will be apparent that the invention provides a measuring device which includes a chart having areas of different shades corresponding to different densities of smoke and having means for providing a sight opening through any one of these areas. Thus the observer may readily match the shade of the smoke observed with one of the areas of the chart without the necessity of accommodating the eye first to a chart having a white background and then to the smoke observed. The chart may be held substantially close to the eye and an accurate and fixed reading may be readily obtained.

While the invention has been described with some detail, it will be apparent that the description is for the purposes of illustration only and is not definitive of the limits of the inventive idea. The right is reserved to make such changes in the details of construction and arrangement of parts as will fall within the purview of the attached claims.

What I claim as my invention is:

1. In a device of the character described, a chart having its entire front face covered with a series of bands of different shades corresponding to different densities of smoke, said chart being provided with an elongated slot which extends through all of said bands, and means for cutting out the light transmitted through said slot while providing a sight opening through said slot in juxtaposition to any one of said bands.

2. In a device of the character described, a chart having areas of different shades arranged in a predetermined series and corresponding to different densities of smoke, said chart being provided with a slot extending through all of said areas, and a member for closing said slot, said member having a sight opening registering with said slot and being movable for varying the position of said sight opening relative to said areas.

3. In a device of the character described, an opaque chart having one surface thereof divided into areas of different shades corresponding to smoke of different densities, said chart being provided with an elongated slot forming an opening through all of said areas, and an elongated member slidably mounted on the rear face of said chart for substantially closing said opening, said elongated member having a sight opening in registry with the opening in said chart.

4. In a device of the character described, a sheet of opaque material having its front face divided into areas of different shades corresponding to smoke of different densities, said sheet of opaque material being provided with a slot which extends through all of said shaded areas, a member for substantially closing the slot in said sheet of opaque material, said member having a sight opening in registry with the said slot, and means slidably mounting said member on the rear face of said sheet of material whereby the said member is adjustable to shift the position of the sight opening therein relative to the shaded areas on the front face of said sheet of material.

5. In a device of the character described, a sheet of opaque material having its front face divided into areas of different shades corresponding to smoke of different densities, said sheet being slotted to provide for the observing of smoke to be compared with the shaded areas of the sheet, and means for limiting the visibility through said sheet to only one or through adjacent portions of two of said areas at a time.

6. In a device of the character described, a chart having areas of different shades corresponding to smoke of different densities, said chart being apertured to provide for the observing of smoke to be compared with the shaded areas on the chart, and means for limiting visibility through the chart to a predetermined portion thereof, said means being movable to provide for the viewing of the smoke through only one or through adjacent portions of two of said areas.

7. In a color comparing device, a sheet having color bands on its front face, said sheet being apertured to permit an object to be observed therethrough, and means upon the back of said sheet providing a sight opening registrable with the aperture in the sheet, said means including an apertured member shiftable with respect to the sheet whereby the sight opening may be adjusted with reference to the several color bands and the object to be observed may be viewed in juxtaposition to one or portions of two of the color bands.

8. In a device of the character described, a sheet of relatively stiff material, one face of said sheet being divided into a series of areas of solid colors of different shades to correspond to different densities of smoke, said sheet having a slot extending across adjacent areas of the series, and means for cutting off the light which would otherwise be transmitted through the slot and providing for focusing the vision of the observer on the smoke being observed, including a member mounted to move on the other face of the sheet and having a sight opening for registering with the slot aforesaid.

9. In a device of the character described, a sheet of relatively stiff material, one face of said sheet being divided into a series of areas of solid colors of different shades to correspond to different densities of smoke, said sheet having a slot extending across all of the areas and providing a light opening through which smoke may be observed, and means for cutting off the light which would otherwise be transmitted through the length of the slot and providing for focusing the vision of the observer on the smoke being observed, including a slide mounted to move lengthwise of the slot and having a sight opening registering with the slot aforesaid, said opening being approximately the width of one of said areas.

10. In a device of the character described, a relatively stiff sheet of opaque material provided upon its front face with areas of solid colors of different shades to correspond to different densities of smoke, said sheet having a relatively narrow slot extending through said areas through which the smoke to be compared with the areas may be observed, and means for cutting off the light which would otherwise be transmitted through the slot and providing for focusing the vision of the observer on the smoke being observed, including a member on the back of the sheet having a sight opening for registering with the slot aforesaid, said member being shiftable relative to the sheet to shift the position of the sight opening therein relative to the areas aforesaid on the front face of the sheet.

HARVEY E. BUMGARDNER.